United States Patent
Minamizawa

[19]

[11] Patent Number: 6,065,074
[45] Date of Patent: May 16, 2000

[54] MULTI-FUNCTION PERIPHERAL DEVICE FOR PREVENTING THE EXECUTION OF INTERFERING OR REDUNDANT TASKS

[75] Inventor: Fumihiro Minamizawa, Toyoake, Japan

[73] Assignee: Brother Kogyo Kabushiki Kaisha, Nagoya, Japan

[21] Appl. No.: 08/915,564

[22] Filed: Aug. 21, 1997

[30] Foreign Application Priority Data

Aug. 23, 1996 [JP] Japan .................................. 8-222031

[51] Int. Cl.$^7$ ...................................................... G06F 3/00
[52] U.S. Cl. ............................... 710/54; 710/54; 710/36; 710/39; 710/40
[58] Field of Search ........................... 709/3, 5, 8; 710/6, 710/28, 36–45, 15–20; 712/38, 42

[56] References Cited

U.S. PATENT DOCUMENTS

| | | | |
|---|---|---|---|
| 4,815,030 | 3/1989 | Cross | 707/10 |
| 5,168,566 | 12/1992 | Kuki | 395/673 |
| 5,226,150 | 7/1993 | Callander | 714/57 |
| 5,230,048 | 7/1993 | Moy | 707/1 |
| 5,481,707 | 1/1996 | Murphy, Jr. | 395/672 |
| 5,689,631 | 11/1997 | Chenoworth | 395/182.09 |

*Primary Examiner*—Meng-Ai T. An
*Assistant Examiner*—Stacy Whitmore
*Attorney, Agent, or Firm*—Oliff & Berridge, PLC

[57] ABSTRACT

A multi-function peripheral device serves as a peripheral device for an information processing unit and is capable of simultaneously executing a plurality of tasks of a plurality of functions by multi-task processing. The multi-function peripheral device includes: an execution command generating unit that determines the task to be executed and that generates an execution command for the task; a task execution unit for executing a task to be executed based on the execution command generated by the execute command generating unit; a presently executed task determination unit that determines any tasks presently being executed; and a task execution prevention unit that compares the any tasks presently being executed as determined by the presently executed task determination unit with the task to be executed as indicated by the execution command generated by the execute command generating unit and that, when the task to be executed matches one of the any tasks presently being executed, prevents the task execution unit from executing the task to be executed.

17 Claims, 2 Drawing Sheets

MULTI-FUNCTION PERIPHERAL DEVICE FOR PREVENTING THE EXECUTION OF INTERFERING OR REDUNDANT TASKS

BACKGROUND OF THE INVENTION

1. Field of the Invention

The present invention relates to a multi-function peripheral device having a plurality of functions such as a scanner function and a printer function that is capable of simultaneously executing the plurality of functions using multi-task processing.

2. Description of the Related Art

Recently, development of multi-function peripheral devices has been proceeding at a startling rate. Such multi-function peripheral devices can serve as a peripheral device of an information processing device such as a personal computer. The multi-function peripheral devices include a plurality of functions such as scanner and printer functions. The multi-function peripheral devices are capable of simultaneously executing the plurality of functions by using multi-task processing.

SUMMARY OF THE INVENTION

There has been a problem in multi-function peripheral devices in that redundant task execution commands can be generated to execute tasks that are already being executed. The redundant task execution commands can be caused when a user erroneously operates the personal computer or when noise or abnormalities in the cable connecting the multi-function peripheral device to the personal computer change a print start command so that it appears as more than one consecutive print start commands.

Also, the redundant task execution commands can be generated when the same request for a task is inputted to the computer from different ports. For example, when the multi-function peripheral device has a normal port and also an extension port for connecting to a personal computer, when print data is being inputted from the personal computer through the normal port, so that the multi-function peripheral device is executing a print task and print processes, input of LAN data as print data from the personal computer through the extension port will cause the multi-function peripheral device to generate a redundant print task execution command.

Also, noise, abnormalities in the cable, and the like can change the print data outputted from the personal computer so that the multi-function peripheral device erroneously distinguishes two blocks where only one block of print data exists. The second block of print data can erroneously cause the multi-function peripheral device to generate a redundant print task execution command.

In such cases, conventional multi-function peripheral devices must perform error processes in order to terminate the task started up by the redundant execution command.

After a conventional multi-function peripheral device uses error processes to terminate an erroneously started task, the multi-function peripheral device must restart the task and again execute the processes from the start, which is inefficient. Also, during the error processes, the memory of the multi-function peripheral device for storing print data from the personal computer is reset. Any print data inputted from the personal computer and stored in the memory is erased when the memory is reset. Therefore, the print data must again be inputted from the personal computer. This wastes time and also adversely affects other processes being performed by the personal computer.

It is an objective of the present invention to overcome the above-described problems and to provide a multi-function peripheral device that will not terminate a task by error processes even when an execution command is generated for the task presently being executed.

A multi-function peripheral device according to the present invention serves as a peripheral device for an information processing unit and is capable of simultaneously executing a plurality of tasks of a plurality of functions by multi-task processing. In order to achieve the above-described objectives, the multi-function peripheral device includes: an execution command generating unit that determines the task to be executed and that generates an execution command for the task; a task execution unit for executing a task to be executed based on the execution command generated by the execute command generating unit; a presently executed task determination unit that determines any tasks presently being executed; and a task execution prevention unit that compares the any tasks presently being executed as determined by the presently executed task determination unit with the task to be executed as indicated by the execution command generated by the execute command generating unit and that, when the task to be executed matches one of the any tasks presently being executed, prevents the task execution unit from executing the task to be executed.

According to this configuration, the task execution prevention unit prevents the task execution unit from executing the task indicated by the execution command from the execution command generating unit when the task to be executed is already presently being executed. Therefore, even if a task execution command is generated for a task presently executed, the task presently being executed will continue to be normally performed without being terminated by error processes.

When a task is terminated by error processes, it must be restarted so that all processes must again be performed from the start, thereby wasting time. However, with the above-described configuration, because the same task will not be executed twice, this is unnecessary. Also, in the conventional situation, when a printer task is terminated by error processes, the memory storing print data inputted from the information processing device is reset so the data is lost. Also, the print data must again be inputted from the information processing device which adversary affects other processes being performed in the information processing device. These problems are also solved by the present invention.

The present invention can be applied to tasks for a variety of different functions of a peripheral device of an information processing unit: such as a printer function, a scanner function, a copy function, and a facsimile transmission/reception function. Other functions are also conceivable.

The execution command generation unit, the task execution unit, the presently executed task determination unit, and the task execution prevention unit can be embodied by operating a CPU or a microprocessor based on a predetermined program stored in a ROM and the like.

According to another aspect of the present invention, the execution command generating unit determines the task to be executed based on information inputted from operations by a user. For example, when the user operates a key for making a copy or operates a key for transmitting a fax, the operation portion of the multi-function peripheral device outputs an operation signal accordingly. When the operation signal indicates a key operation for making copies, then the execution command generation unit outputs a command to execute a copy task. When the operation signal indicates a key operation for sending a facsimile transmission, then the execution command generation unit outputs a command to execute a facsimile task. In this way, the execution command generating unit can properly make determinations.

According to another aspect of the present invention, the execution command generating unit determines the task to be executed based on information inputted from an external source. For example, when a personal computer inputs print data to the multi-function peripheral device, then the execution command generating unit can determine that a printer task is to be executed.

According to another aspect of the present invention, the plurality of functions includes a printer function. The start up indication generation unit determines that the task to be started up is a printer task based on input of print data from the information processing device.

With this configuration, even when a printer task execution command is generated while a printer task is presently being executed, then the printer task will not be terminated by error processes. Accordingly, the memory storing print data inputted from the information processing device will not be reset and the print data will not be lost.

The units described above can be embodied by operating the CPU of the multi-function peripheral device based on a program stored in its ROM, for example. Also, various programs for operating the various units can be embodied by programs stored in the ROM of the multi-function peripheral device.

BRIEF DESCRIPTION OF THE DRAWINGS

The above and other objects, features and advantages of the invention will become more apparent from reading the following description of the preferred embodiment taken in connection with the accompanying drawings in which.

DETAILED DESCRIPTION OF THE PREFERRED EMBODIMENT

Figure 1:
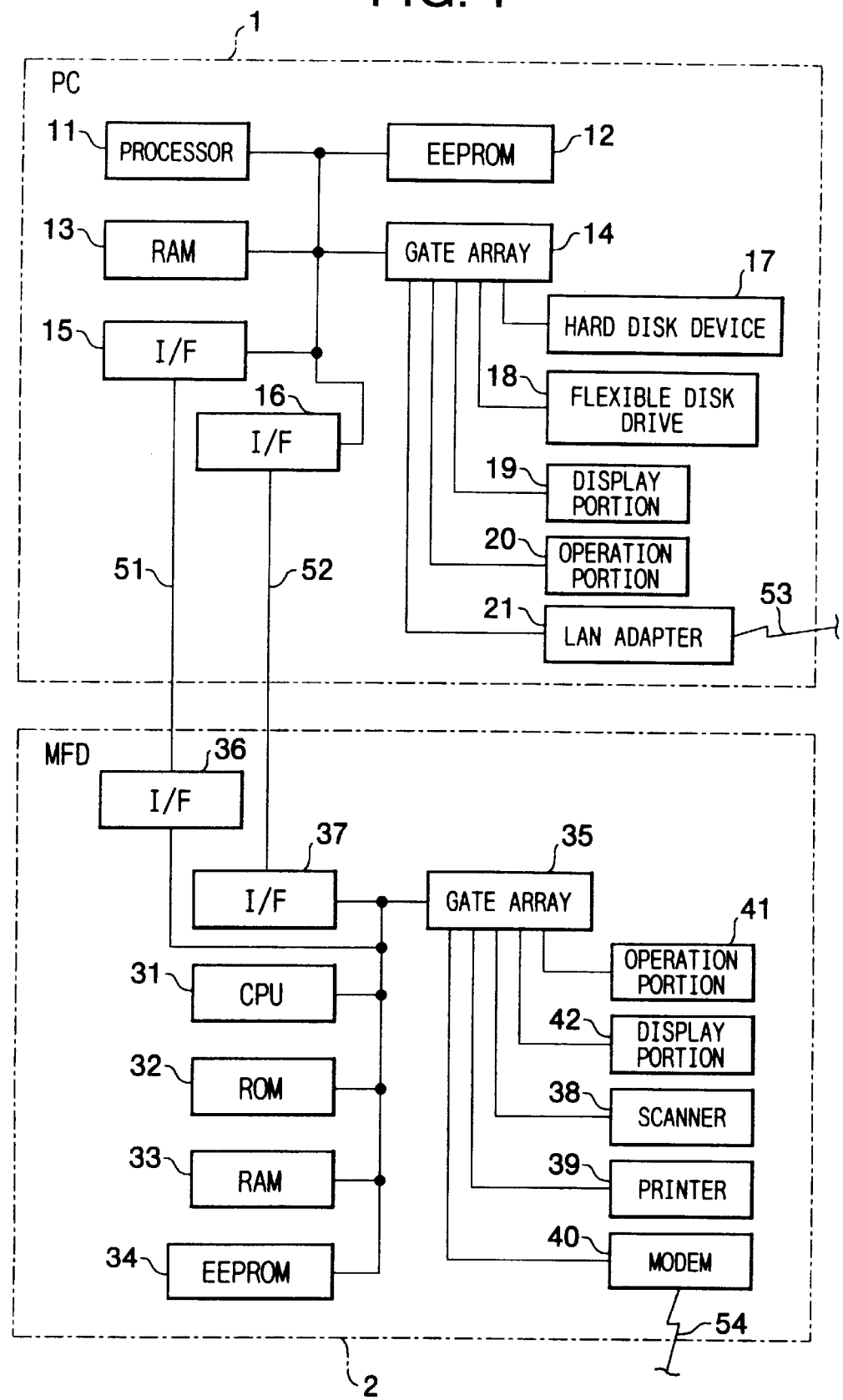
FIG. 1 is a block diagram showing electrical configuration of a personal computer and a multi-function peripheral device according to an embodiment of the present invention while the personal computer is connected to the multi-function peripheral device.

A multi-function peripheral device according to a preferred embodiment of the present invention will be described while referring to the accompanying drawings wherein like parts and components are designated by the same reference numerals to avoid duplicating description.

FIG. 1 is a block diagram showing circuitry of a multi-function peripheral device 2 and a personal computer 1 when the multi-function peripheral device 2 is connected to the personal computer 1. The personal computer 1 uses a graphical user interface (GUI) including multi-windows. The personal computer 1 is capable of simultaneously executing a variety of application software. The multi-function peripheral device is capable of performing a plurality of functions such as a facsimile function, a printer function, an image scanner function, and a copy function.

First, an explanation will be provided for the personal computer 1. The personal computer 1 includes: a processor 11, an EEPROM 12, a RAM 13, a gate array 14, an interface 15 for parallel transmission of data, an interface 16 for serial transmission of data, a hard disk device 17, a floppy disk drive 18, a display portion 19, an operation portion 20, and a local area network (LAN) adapter 21. The processor 11, the EEPROM 12, the RAM 13, the gate array 14, and the interfaces 15, 16 are connected together by a bus line. The bus line can be a data bus, an address bus, and a control signal line, or any combination of these. The hard disk device 17, the floppy disk drive 18, the display portion 19, the display portion 19, operation portion 20, and the LAN adapter 21 are connected to the gate array 14. A local area network (LAN) 53 is connected to the LAN adapter 21 of the personal computer 1.

The processor 11 operates to perform information processing based on programs such as a variety of application software and operation systems installed in the hard disk device 17. The EEPROM 12 stores a variety of registration data and the like. The RAM 13 stores a variety of data used by a variety of application software and the like. The gate array 14 functions as an interface between the processor 11 and other components including the hard disk device 17, the floppy disk drive 18, the display portion 19, the operation portion 20, and the LAN adapter 21. The parallel transmission interface 15 controls transmission and reception of data between the personal computer 1 and the multi-function peripheral device 2 based on a particular standard such as Centronics. The serial transmission interface 16 controls transmission and reception of data between the personal computer 1 and the multi-function peripheral device 2 based on a particular standard such as RS-232C. The hard disk device 17 stores a variety of application software programs. The floppy disk drive 18 retrieves information from a floppy disk or writes information on the floppy disk.

The display portion 19 can be a liquid crystal display and is controlled by the processor 11 to display figures, characters, and the like. The operation portion 20 can be a keyboard or a mouse for outputting operation signals based on operations of the user. The LAN adapter 21 functions as an interface between the personal computer 1 and the LAN 53.

Now, a description will be provided for configuration of the multi-function peripheral device 2. The multi-function peripheral device 2 includes a CPU 31, a ROM 32, a RAM 33, an EEPROM 34, a gate array 35, a parallel transmission interface 36, a serial transmission interface 37, a scanner 38, a printer 39, a modem 40, an operation portion 41, and a display portion 42. The CPU 31, the ROM 32, the RAM 33, the EEPROM 34, the gate array 35, and the interfaces 36, 37 are connected together by a bus line. The bus line can be a data bus, an address bus, a control signal line, or a combination of these. The gate array 35 is connected with the scanner 38, the printer 39, the modem 40, the operation portion 41, and the display portion 42. The interface 36 is connected to the interface 15 of the personal computer 1 via a cable 51. The interface 37 is connected to the interface 16 of the personal computer 1 via a cable 52. The modem 40 of the multi-function peripheral device 2 is connected to a telephone circuit 54.

The CPU 31 performs overall control of the multi-function peripheral device 2. The ROM 32 stores programs for controlling the multi-function peripheral device 2. The RAM 33 stores a variety of data. The EEPROM 34 stores a variety of flags and registration data. The gate array 35 functions as an interface between the CPU 31 and other components including the scanner 38, the printer 39, the modem 40, the operation portion 41, and the display portion 42. The interface 36 controls transmission and reception of data between the personal computer 1 and the multi-function peripheral device 2 based on a standard such as Centronics. The interface 37 controls transmission and reception of data between the personal computer 1 and the multi-function peripheral device 2 based on a standard such as RS-232C. The scanner 38 retrieves an image from a document and converts the image into an image signal. The printer 39 prints an image based on image data or other data. To transmit and receive facsimile messages, the modem 40 modulates a carrier wave according to transmission data and demodulates received carrier waves to obtain the received data. The operation portion 41 includes a plurality of key switches and outputs operation signals according to key switches operated by the user. The display portion 42 includes a liquid crystal display and is controlled by the CPU 31 to perform a variety of display operations.

The hard disk device 17 of the personal computer 1 is installed with multi-function device (MFD) control application software for performing a variety of functions in the multi-function peripheral device 2. For example, the hard disk device 17 is installed with software for: using the modem 40 of the multi-function peripheral device 2 to enable facsimile transmission between the personal computer 1 and a remote facsimile machine; using the printer 39 to print text and images prepared in the personal computer 1; and using the scanner 38 to retrieve images and input the resultant image signals into the personal computer 1. The MFD control application software is installed in the hard disk device 17 by inserting a floppy disk including the MFD control application software into the floppy disk drive 18 and performing predetermined operations to copy the MFD control application software onto the hard disk device 17. The MFD control application software includes: fax driver software for performing data conversion such as converting text data into bit map data; log manager software for logging and displaying a transmission record; and status monitor software for overseeing transmission and reception of data between the personal computer 1 and the personal computer 1.

Next, an explanation will be provided for operations of the multi-function peripheral device 2 having the above-described configuration. The multi-function peripheral device 2 is capable of performing a plurality of tasks, including: a printer task for using the printer 39 to print any print data inputted to the interfaces 36, 37 over the cables 51, 52 from the personal computer 1; a scanner task for using the scanner 38 to retrieve an image from a document and outputting image data accordingly to the personal computer 1; a copy task for using the printer 39 to print image data of an image retrieved from document by the scanner 38; and a facsimile task for transmitting image data of a document retrieved by using the scanner 38 as a facsimile transmission data over the telephone circuit 54 and for using the printer 39 to print facsimile reception data inputted over from the telephone circuit 54. The multi-function peripheral device 2 is capable of using time sharing processes to simultaneously perform a plurality of these tasks without operations of different tasks interfering with each other. For example, scanner operations and facsimile transmission operations which do not require the printer 39, can be performed while the printer function is being performed. Therefore, the printer task, the scanner task, and/or the facsimile task can be executed simultaneously by multi-task processes. However, because copy operations require use of the printer 39, printer operations can not be performed simultaneously with copy processes, which means that a printer task can not be performed simultaneously with a copy task. It should be noted that the printer 39 is not used during facsimile reception operations if the facsimile data is stored in the RAM 33 after it is received, rather than printed out. In this case, facsimile operations can be performed simultaneously with printer operations.

There are certain situations where a task execution command is erroneously generated for executing a task presently being executed. For example, when print data is inputted from the personal computer 1 over the cable 51 into the interface 36, a printer task is executed so that the printer data is printed using the printer 39. However, if while the printer 39 is printing in this manner, data inputted over the LAN 35 to the LAN adapter 21 is inputted as print data from the personal computer 1 over the cable 52 into the interface 37, then a redundant printer task execution command is sometimes erroneously generated. In this case, because a printer task is already being executed, an error will be generated so that the printer task presently being executed will be forcibly terminated by error processes. However, as will be described later the multi-function peripheral device 2 according to the present embodiment is capable of ignoring the redundant printer task execution command and continues processing using the printer task presently being executed.

Accordingly, with the multi-function peripheral device 2 of the present embodiment, there is no need to again perform the series of processes, such as inputting print data from the personal computer 1 over the cable 51 that have already been performed during the printer task presently being executed. Therefore, printer operations can be effectively executed. Of course, this is not limited to redundant printer task execution commands, but also applies to other task execution commands, as will be described later.

Figure 2:
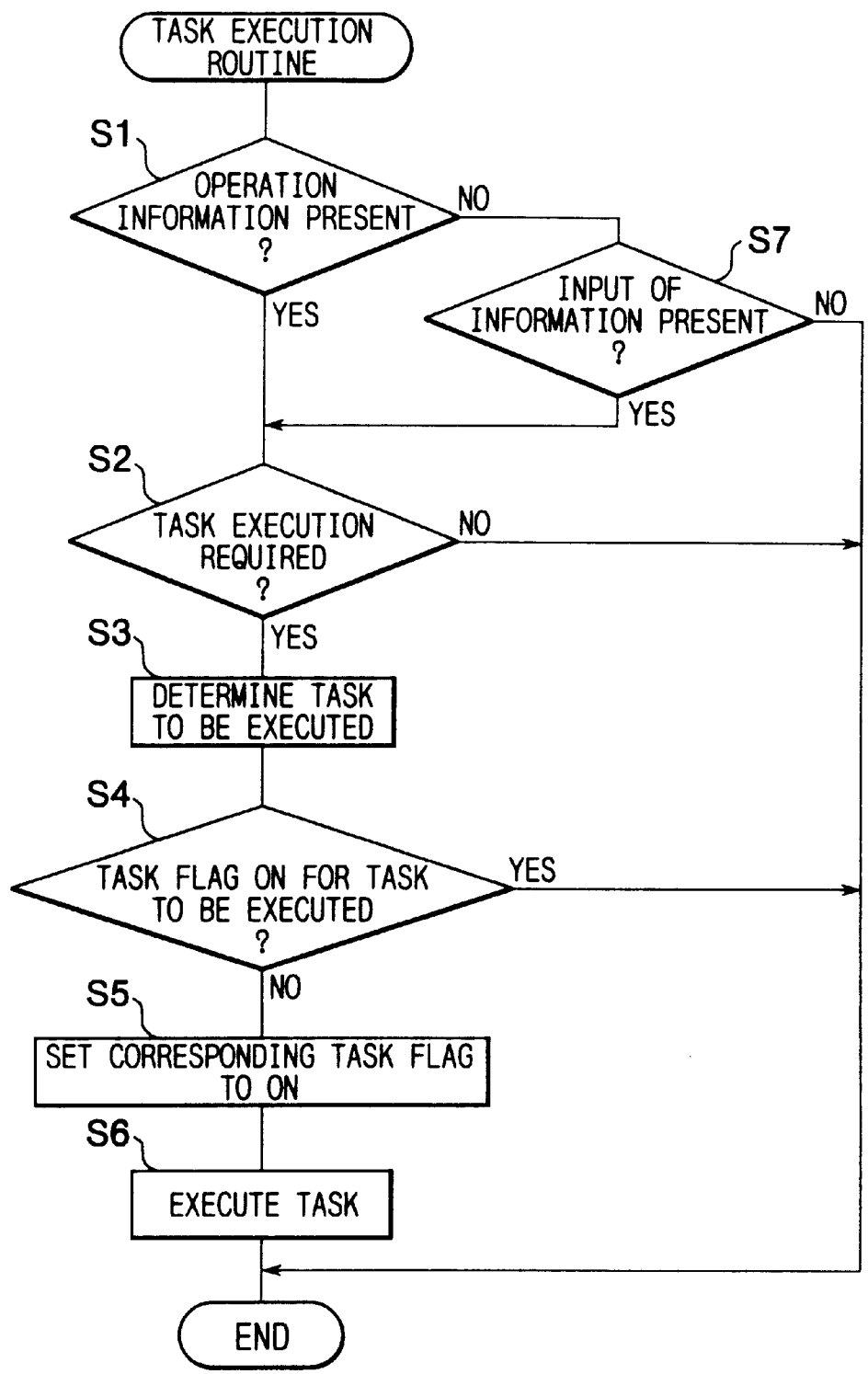
FIG. 2 is a flowchart representing a task execution routine performed by the multi-function peripheral device of FIG. 1.

Next, operations for task execution processes for avoiding redundant execution of the same task will be explained while referring to the flowchart shown in FIG. 2.

First in S1, the CPU 31 of the multi-function peripheral device 2 determines whether or not operation information is present. That is to say, the CPU 31 investigates whether or not a user has operated the operation portion 41 so that the operation portion 41 outputs an operation signal. Because the operation signal from the operation portion 41 is converted into operation data by the gate array 35 and supplied to the CPU 31, the CPU 31 can easily determine whether or not operation information is present.

When operation information is present (S1:YES), then in S2, the CPU 31 determines whether or not a task needs to be executed. For example, even if the operation portion 41 is operated, there are some cases where no task needs to be executed as a result. When the CPU 31 determines that a task needs to be executed (S2:YES), then the CPU 31 in S3 determines the task to be executed. For example, when the copy key is operated on the operation portion 41, then the CPU 31 determines that it is necessary to execute a copy task.

Afterwards, in S4 the CPU 31 determines whether or not a task flag corresponding to the task to be executed is ON. That is to say, flags corresponding to each task are stored in the EEPROM 34. When a task is executed, the corresponding flag of the task is turned on. When the task presently being executed is completed, then the corresponding flag for that task is turned off. Accordingly, the CPU 31 can determine which task is presently being executed by investigating the ON and OFF status of its corresponding flag.

For example, when the CPU 31 determines in S3 that the task to be executed is the copy task, then in S4, it determines whether the flag corresponding to the copy task is ON or OFF.

If the CPU 31 determines that the flag corresponding to the task to be executed is turned off (S4:NO), this means that the task to be executed is not presently being executed so that in S5 the CPU 31 turns on the flag corresponding to the task to be executed. Next, in S6, the CPU 31 executes the task to be executed and the routine is ended. It should be noted that either S6 or S5 can be performed first. That is to say, the task can be started before the corresponding flag is turned on. In other words, S5 can be performed after S6.

If in S4, the CPU 31 determines that the flag corresponding to the task to be executed is turned on, then this means that the task to be executed is already being executed. Therefore, the routine is ended here. As a result, the same task will not be redundantly executed so that the task presently being executed can be properly continued.

If in S2, it is determined that a task execution is not required (S2:NO), then it is determined that no task needs to be executed so that the routine is ended.

If in S1, it is determined that no operation information is present (S1:NO), then this means that the user did not operate the operation portion 41. Therefore, the CPU 31 in S7 determines whether or not input information is inputted from an external source. In the present embodiment, the CPU 31 investigates whether or not data has been inputted to the multi-function peripheral device 2 from the personal computer 1 over the cables 51, 52 or from a remote device over the telephone circuit 54.

When the CPU 31 determines that data has been inputted from an external source (S7:YES), then the routine proceeds to S2 wherein the CPU 31 determines whether or not a task needs to be executed. After S2, other processes are performed in the same manner as described above.

For example, when the printer task is not presently being executed, the printer task must be executed when print data from the personal computer 1 is inputted over the cable 51 or print data from the LAN 53 is inputted from the personal computer 1 over the cable 52. Also, when the facsimile task is not presently being executed, there is a need to execute the facsimile task when facsimile data is inputted from a remote facsimile machine and the like over the telephone circuit 54. The CPU 31 investigates input of this type of information is S7.

On the other hand, when no data is inputted from an external source (S7:NO), then the CPU 31 determines the user has not operated the operation portion 41 and that no data has been inputted over the cables 51, 52 or the telephone circuit 54. Therefore, the routine is ended. This task execution process is executed each time a predetermined duration of time elapses, thereby monitoring the need to perform various tasks.

While the invention has been described in detail with reference to specific embodiments thereof, it would be apparent to those skilled in the art that various changes and modifications may be made therein without departing from the spirit of the invention, the scope of which is defined by the attached claims.

What is claimed is:

1. A multi-function peripheral device serving as a peripheral device for an information processing unit and capable of simultaneously executing a plurality of tasks of a plurality of functions by multi-task processing, the multi-function peripheral device comprising:

a task execution unit for executing a task to be executed;

a presently executed task determination unit that determines any tasks presently being executed; and a task execution prevention unit that compares the any tasks presently being executed as determined by the presented executed task determination unit with the task to be executed and that, when execution of the task to be executed would interfere with execution of one of the any tasks presently being executed, prevents the task execution unit from executing the task to be executed, thereby preventing redundant execution of tasks and preventing termination of execution of the one of the any tasks presently being executed.

2. A multi-function peripheral device as claimed in claim 1, further comprising, an execution command generating unit that determines the task to be executed and that generates an execution command for the task, wherein the task execution unit executes the task to be executed based on the execution command generated by the execute command generating unit, and wherein the task execution prevention unit compares the task presently being executed with the task to be executed as indicated by the execution command generated by the execute command generating unit.

3. A multi-function peripheral device as claimed in claim 2, wherein the execution command generating unit determines the task to be executed based on information inputted from an external source.

4. A multi-function peripheral device as claimed in claim 3, further comprising a task execution requirement unit that determines if information inputted from the external source indicates a need to perform a task, the execution command generating unit determining the task to be executed when the task execution requirement unit determines that information indicates a need to perform a task.

5. A multi-function peripheral device as claimed in claim 2, wherein the execution command generating unit determines the task to be executed based on information inputted from an operation performed by a user.

6. A multi-function peripheral device as claimed in claim 5, further comprising a task execution requirement unit that determines if information inputted from an operation performed by a user indicates a need to perform a task, the execution command generating unit determining the task to be executed when the task execution requirement unit determines that information indicates a need to perform a task.

7. A multi-function peripheral device as claimed in claim 2, wherein the plurality of functions includes a printer function and wherein the execution command generating unit determines that the task to be started up is a printer task based on input of print data from the information processing device.

8. A multi-function peripheral device as claimed in claim 2, further comprising a flag setting unit including a flag for each of the plurality of tasks and that, each time the task execution unit executes one of the tasks, sets a flag corresponding to the one of the tasks, wherein the presently executed task determination unit determines the any tasks presently being executed based on the flags in the flag setting unit.

9. A storage medium for operating a multi-function peripheral device serving as a peripheral device for an information processing program and capable of simultaneously executing a plurality of tasks of a plurality of functions by multi-task processing, the storage medium storing:

an execution command generating program that determines the task to be executed and that generates an execution command for the task;

a task execution program for executing a task to be executed based on the execution command generated by the execute command generating program;

a presently executed task determination program that determines any tasks presently being executed; and a task execution prevention program that compares the any tasks presently being executed as determined by the presently executed task determination program with the task to be executed as indicated by the command generated by the execution command generating program and that, when execution of the task to be executed would interfere with execution of one of the any tasks presently being executed, prevents the task execution unit from executing the task to be executed, thereby preventing redundant execution of tasks and preventing termination of execution of the one of the any tasks presently being executed.

10. A multi-function peripheral device as claimed in claim 1, further comprising an execution requirement indication unit that indicates requirement to perform a task.

11. A multi-function peripheral device as claimed in claim 10, further comprising a required task determination unit that determines and indicates the task to be executed based on information inputted from an external source, the task execution prevention unit comparing the task presently being executed with the task indicated by the required task determination unit.

12. A multi-function peripheral device as claimed in claim 11, wherein the plurality of functions includes a printer function and wherein the required task determination unit determines the task to be executed is a printer task based on input of print data from the external source.

13. A multi-function peripheral device as claimed in claim 10, wherein the execution requirement indication unit determines requirement to perform a task based on user input, and further comprising a required task determination unit that determines the task to be executed based on the user input.

14. A multi-function peripheral device as claimed in claim 10, further comprising a flag setting unit including a flag for each of the plurality of tasks and that, each time the task execution unit executes one of the tasks, sets a flag corresponding to the one of the tasks, wherein the presently executed task determination unit determines the any tasks presently being executed based on the flags in the flag setting unit.

15. A multi-function peripheral device as claimed in claim 1, further comprising a modem for performing a facsimile task;

a printer for performing a print task; and a scanner for performing a scan task;

wherein the task execution unit executes a task to be executed relating to operation of at least one of the modem, the printer, and the scanner.

16. A storage medium as claimed in claim 9, further comprising:

a modem program for performing a facsimile task;

a printer program for performing a print task; and a scanner program for performing a scan task;

wherein the task execution command generating program generates an execution command for the task relating to at least one of the modem program, the printer program, and the scanner program.

17. A multi-function peripheral device serving as a peripheral device for an information processing unit and capable of simultaneously executing a plurality of tasks of a plurality of functions by multi-task processing, the multi-function peripheral device comprising:

a modem for performing a facsimile task;

a printer for performing a print task;

a scanner for performing a scan task;

a task execution unit for executing a task to be executed relating to operation of at least one of the modem, the printer, and the scanner;

a presently executed task determination unit that determines any tasks presently being executed; and a task execution prevention unit that compares the any tasks presently being executed as determined by the presently executed task determination unit with the task to be executed and that, when the task to be executed matches one of the any tasks presently being executed, prevents the task execution unit from executing the task to be executed, thereby preventing redundant execution of tasks.

* * * * *